(12) United States Patent
Joseph

(10) Patent No.: US 7,895,190 B2
(45) Date of Patent: Feb. 22, 2011

(54) INDEXING AND QUERYING XML DOCUMENTS STORED IN A RELATIONAL DATABASE

(75) Inventor: Jojo Joseph, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 414 days.

(21) Appl. No.: 12/146,058

(22) Filed: Jun. 25, 2008

(65) Prior Publication Data

US 2009/0327253 A1    Dec. 31, 2009

(51) Int. Cl.
G06F 7/00 (2006.01)
G06F 17/30 (2006.01)

(52) U.S. Cl. .................... 707/715; 707/716; 707/771

(58) Field of Classification Search .............. 707/694, 707/711, 715, 716, 741, 755, 765, 771
See application file for complete search history.

(56) References Cited

U.S. PATENT DOCUMENTS

| | | | |
|---|---|---|---|
| 6,510,434 B1 | 1/2003 | Anderson et al. | |
| 6,584,459 B1 | 6/2003 | Chang et al. | |
| 7,162,485 B2* | 1/2007 | Gottlob et al. | 707/769 |
| 7,260,585 B2* | 8/2007 | Krishnaprasad et al. | 707/694 |
| 7,730,080 B2* | 6/2010 | Liu et al. | 707/765 |
| 7,739,219 B2* | 6/2010 | Liu et al. | 707/718 |
| 7,747,610 B2* | 6/2010 | Chinchwadkar et al. | 707/716 |
| 2002/0116371 A1 | 8/2002 | Dodds et al. | |
| 2005/0228791 A1 | 10/2005 | Thusoo et al. | |
| 2006/0053122 A1 | 3/2006 | Korn et al. | |
| 2009/0037379 A1* | 2/2009 | Bou-Diab et al. | 707/3 |
| 2009/0259641 A1* | 10/2009 | Balmin et al. | 707/4 |

OTHER PUBLICATIONS

Journal Paper: Berkely DB XML: An embedded XML database. By Paul Ford, May 7, 2003 (http://www.xml.com/pub/a/2003/05/07/bdb.html).

* cited by examiner

*Primary Examiner*—Don Wong
*Assistant Examiner*—Merilyn P Nguyen

(57) ABSTRACT

A method is disclosed for indexing and querying XML documents stored in a relational database. A user is allowed to choose columns of a database table for storing XML data of a known structure. The user has to input one or more XML paths for indexed data. Each path is stored in a static index table. In response to the input of the user defined paths, at least one dynamic index table is created for each static index table. The dynamic index table is updated upon data being entered into the database table. When a user's query is intercepted, any XML expression part of the query is processed and converted into one or more rows in the static index table. A new query is generated against the dynamic indexing tables, using the values obtained from the static index table, and executed. The user's query is then rewritten by transforming the XML path part of the user's query expression into a format understood by the database query engine. Finally, after the rewritten query is executed, the result is returned to the user, together with any non-XML part of the user's query, executed by the database query engine.

6 Claims, 2 Drawing Sheets

INDEXING AND QUERYING XML DOCUMENTS STORED IN A RELATIONAL DATABASE

TECHNICAL FIELD

The present invention relates to a method for indexing and querying eXtensible Markup Language (XML) documents stored in a relational database using a set of syntax rules for defining the XML document.

BACKGROUND OF THE INVENTION

Due to the increasing popularity of Relational Database Management System (RDBMS) and eXtensible Markup Language (XML) documents, often there is a need to store XML data in a relational database. Once an XML document is stored in a column within an RDBMS table, conducting a standard text search on such a document would only search its contents, and such a search can be relatively slow compared to searching strings in a relational database, especially if the XML document is large. A disadvantage is that creating indices on a large text data is inefficient, especially in relation to RDBMS.

One known solution uses an XML extender for the RDMS, which has specially designed mechanisms to store and search XML documents. These XML extenders store the XML data as a parsed tree, instead of storing the data as an XML string. However, a disadvantage is that not all relational databases provide support for such an XML extender.

Accordingly, it is desirable to develop a method that would allow to efficiently store and index XML data in relational databases without an XML extender support.

SUMMARY OF THE INVENTION

Accordingly, the invention provides a method, system and a computer program product for indexing and querying XML documents stored in a relational database. The method allows a user to chose, within a database table, one or more columns for storing XML data of a known structure. The method further obtains from the user one or more XML paths for indexed data, each of these user defined paths being stored in a static index table. The method further, creates, in response to the input of the user defined paths, at least one dynamic index table for each static index table, the dynamic index table being updated upon data being entered into the database table. The method further, intercepts a user's query to processes any XML expression part of the query and convert it into one or more rows in the static index table. The method further, generates a new query against the dynamic indexing tables, using the values obtained from the static index table, and executing the generated query. The method further, rewrites the user's query by transforming the XML path part of the user's query expression into a format understood by the database query engine; and finally returns the result to the user, after executing the rewritten query, together with any non-XML part of the user's query, that is executed by the database query engine.

Preferably, any XML path of the first aspect is specified by the user in the form of respective XPATH expression, wherein in one embodiment the XPATH may be defined as a set of syntax rules (language) for defining parts of an XML document, and wherein the processed XML expression part of the query is an XML XPATH expression part. Also preferably, the static index table contains one row per XML path. Even more preferably, the static table is updated when the user defines a new database table with an XML column.

DETAILED DESCRIPTION

The proposed method for indexing and querying XML documents stored in a relational database stores the XML documents within any one or more chosen columns of the relational database, not as a parsed tree, but in their original formatting. Accordingly, there is no need to reconstruct the XML document when a query is executed. In the example used here, the support for indexing and querying the database is built using the XPATH technology. This allows the selection of one or more element paths within the XML document. It should be obvious to a person or ordinary skill in the art that other XML—associated languages can also be used in a similar manner.

Support for indexing and querying on XML documents is achieved by allowing the user to specify certain paths within the XML documents (expressed as XPATHs) to be used as indices. These indices will be stored in a dynamic index table which will be created by the system.

Figure 1:
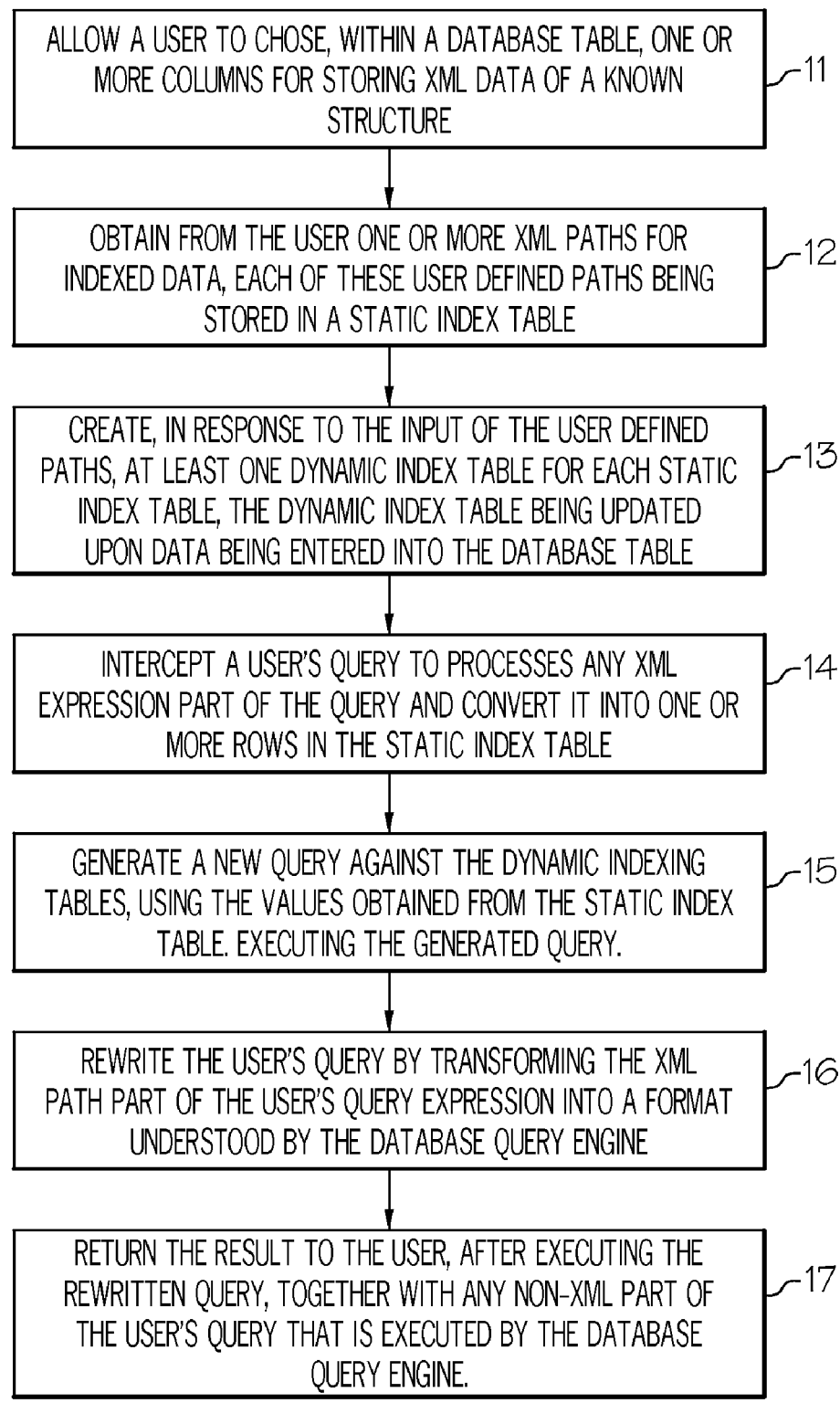
FIG. 1 is a schematic flow diagram of the proposed method for indexing and querying XML documents stored in a relational database.

FIG. 1 illustrates the method for indexing and querying XML documents stored in a relational database in accordance with the present invention. As indicated in step 11, while considering the database design, the user decides which columns will be storing XML data. The user needs to know the structure of the XML data to be stored in each of these columns. The user then defines the XML paths on which the data needs to be indexed (step 12). The user specifies these index paths as input in the form of XPATH expressions, and the user specified index is inserted into a static index table. This table will be updated only when the user defines a new table with an XML column. This table will contain one row per index. As illustrated in step 13, the user's input of XPATH expressions triggers creation of one or more dynamic index tables, one for each static table created. When the user enters data into the database table, update of the dynamic index table by inserting one or more entries into the dynamic index table is triggered.

Any query of the user is intercepted by the custom logic which processes the XML XPATH expression part of the query and converts it into one or more rows in the static table (step 14). In step 15, the custom logic also generates a query against the dynamic indexing tables using the values obtained from the static table and executes the generated query. In step 16, the original query issued by the user is rewritten by transforming the XML path part of the query expression into a format that is understood by the database (DB) query engine. The rewritten query is then executed by the DB query engine and the result is returned to the user, together with any non-XML part of the user's query that is executed by the DB query engine (step 17).

The following section describes the detailed solution, in terms of the user actions and system processes. To facilitate the illustration of the proposed method, a sample scenario is considered where different versions of a purchase order are stored in an order history table. It will be assumed that table is defined as follows:
TABLE pohist (orderId BIGINT, version DECIMAL, poxml VARCHAR(102400))

Figure 3:
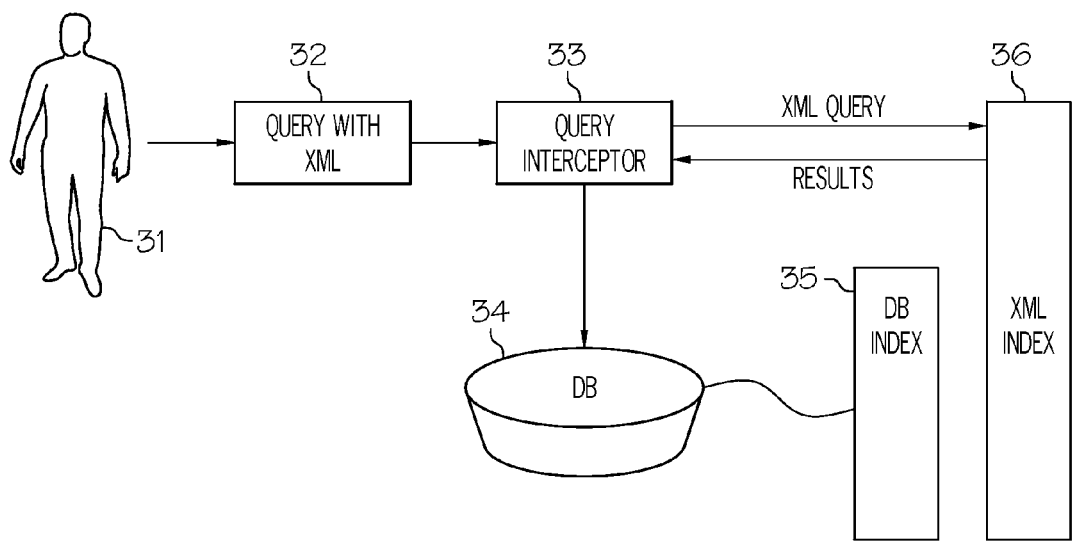
FIG. 3 is a schematic diagram of the proposed method of processing a query in a RDBMS.

In this table, orderId and version together constitutes a composite primary key. The column named 'poxml' holds an XML string representing the order. It is assumed that the XML string and/or data, which will be stored into 'poxml', contains an element representing the merchant order ID on which the user needs to search an order version. The element is identified using an XPATH expression;
//Order/OrderNumbers/MerchantOrderNumber/Id Infrastructure To enable the indexing and querying of XML data, a dynamic indexing unit and a query interceptor unit are deployed on top of the database. These units are illustrated in FIG. 3, which will be discussed in detail later in the text. The indexing unit consists of one statically defined table and one or more dynamically generated tables. These tables hold the index data which will accelerate the XML querying part. The static XML index table is defined as follows:

Table XSI (xsi__Id BIGINT generated, tablename VARCHAR(128), columnname VARCHAR(128), xpath VARCHAR(512), type CHAR(64), dynamictable CHAR(32))
where;
    xsi__id       is the generated primary key,
    tablename   is the name of the table which contains the XML data,
    columnname is the name of the column which contains the XML data,
    xpath        is the XPATH expression to identify an element on
which the index need to be created, type is the actual type of the data expected in the XML element identified by the above XPATH expression, and dynamictable is the name of a dynamic index table to be created to hold the actual index data (see below). This name will be generated based on the xsi_id.

It is possible to create multiple indexes for the same column containing XML data, but for each column in a table, the XPATH expression needs to be unique. For this reason, the combination (tablename, columnname, xpath) is a unique index. The dynamic index table is created whenever a row is inserted into the above XSI table, by using a trigger which gets activated on the insertion of the row. This dynamic table is defined as follows:

Table <dynamictable> (id BIGINT generated, value <type>, <pk(i)> )
where
    <dynamictable>  is the name of the table, obtained from
                      XSI table above
    id               is the id of the row generated
    value          is the actual value and <type> is the type of this
value (defined in the XSI table) and
    <pk(i)>        is the primary key of the table which holds the XML
                      data Therefore, for each index defined by the user (by creating a row in the XSI table), at least one dynamic index table is created. Defining a row in the XSI table also create a trigger for the table which contains the XML data. This trigger gets activated whenever a row is inserted into the table containing XML data and then extracts the value with the given XPATH from the XML and inserts the extracted data into the dynamic table. This data will act as the index.

In addition, the system uses a query interceptor unit which enables the user to issue a query containing an XPATH expression (as defined in XSI table). This unit parses the query, extracts the XPATH part of it and looks into the static and dynamic index tables to resolve the XML part into one or more rows in the table containing the XML data identified by their primary keys. The original query is then re-written to use these value(s) and the resulting query is executed.

User Defines the XML Indexing Scheme

In this step the user defines the element (path in the XML) on which indexing is to be done. It is assumed that this is done when the schema is created. In the example considered here, this is done by issuing the following SQL statement:

Insert into XSI (tablename, columnname, xpath, type) values ('pohist', 'poxml', '//Order/OrderNumbers/MerchantOrderNumber/Id', 'CHAR(32)', 'pohist001');

It should be noted that the above query can be generated automatically by the custom logic once the user inputs the XML path and the type of the data expected in the specified path. Also note that the user does not need to specify value for the generated columns such as 'xsi_id,' since the value is automatically generated. Here it is assumed that the merchant order id is a string of 32 characters.

The above step will automatically identify that the column 'pohist.poxml' contains an XML string, and trigger the creation of a dynamic index table, as well as another trigger for the 'pohist' table. The dynamic index table has the following definition:
TABLE pohist001 (id BIGINT generated, value CHAR(32), pk1 BIGINT, pk2 DECIMAL)
where;
Pohist001 is the generated name of the dynamic index table and
Pk1 and pk2 together form the primary key of the 'pohist' table.

The columns pk1 and pk2 are foreign key references to the table 'pohist', thus enabling identifying a unique row in the 'pohist' table.

User Inserts Data

The SQL expression for a user inserting data with some XML string into the 'pohist' table is as follows:
Insert into pohist values (10001, 1.1, '<xml> . . . </xml>')

It is assumed that the XML element in the above query is defined as follows:

```
<xml>
    <Order>
        <OrderNumbers>
            <MerchantOrderNumber>
                <Id>09999</Id>
            </MerchantOrderNumber>
        </OrderNumbers>
        ...
    </Order>
</xml>
```

Inserting into the 'pohist' table would generate a trigger updating of the dynamic index as well. A new row will be inserted into the dynamic index table by the following statement:

Insert into <table_name>values (<generated_id>, '09999', 10001, 1.1), where '09999' is the value of the merchant order id from the XML document obtained by evaluating the XPATH expression. The two other values uniquely identify the corresponding row in the 'pohist' table.

User Issues a Query

Figure 2:
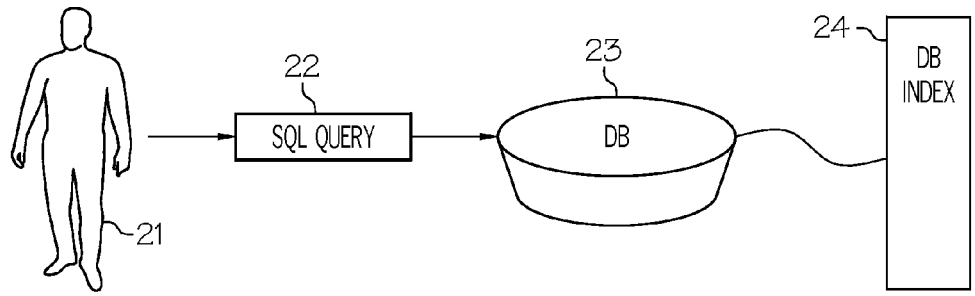
FIG. 2 is a schematic diagram of a standard method of processing a query in a RDBMS.

FIG. 2 illustrates how a standard query of a database works. When a user 21 issues the query 22 to the database 23, the database 23 refers to its own index table 24 (if one exists) for speeding up the query. FIG. 3 illustrates how a similar enquiry, for a purchase order with merchant order id '09999' and made by a user 310, will be considered. The query 32 is the following:

---
Select *from pohist where;
pohist.poxml.xpath.//Order/OrderNumbers/MerchantOrderNumber/Id = '09999'

---

The system is configured in such a way that the query 32 goes to the query interceptor 33 first. The query interceptor 33 identifies that the query has an XPATH expression and needs some pre-processing. The interceptor 33 generates tow subqueries of the format:

---
Select dynamictable from XSI where tablename='pohist'
and columnname='poxml' and xpathxpression =
'.//Order/OrderNumbers/MerchantOrderNumber/Id'.
---

This will return pohist001. The next sub-query created by the query interceptor will be:
Select pk1, pk2 from pohist001 where value='09999'

This would return the primary key for the table pohist as (10001, 1.1). Finally the original query will be re-written as:
Select * from pohist where (pohist.orderid=10001 and version=1.1)
If the query on the dynamic table doesn't get resolved to a single row, then the re-written query will be formatted to use the 'where pohistory.ordorid in ( )' clause.

The Query Interceptor Unit

The query interceptor unit 33 is hooked into the database 34 in such a way that the queries are passed to this unit first, before being executed by the RDBMS. For this purpose, any application should obtain the database connection from the infrastructure provided. These connection objects and statement objects are subclasses of the actual connection and statement objects that would have been returned in the absence of this unit. Thus, the standard query processing path, comprising database 34 and database index 35, is complemented by the XML-queries processing path, comprising the XML index 36.

Other Embodiments

The foregoing describes only some embodiments of the present invention, and modifications and/or changes can be made thereto without departing from the scope and spirit of the invention, the embodiments being illustrative and not restrictive. For example, an electronic apparatus, an executable computer program and a computer program product, comprising computer readable medium having a computer program recorded therein, which are configured to perform the proposed method are also within the scope of the invention.

It is apparent from the above that the hereinbefore described method and arrangements are applicable to the computer and data processing industries.

I claim:

1. A method for indexing and querying XML documents stored in a relational database, the method comprising:
 a) allowing, by a computer, a user to choose, within a database table, one or more columns for storing XML data of a known structure;
 b) obtaining from the user one or more XML paths for indexed data, each of the obtained one or more XML paths being stored in a static index table;
 c) creating, in response to the obtained one or more XML paths, at least one dynamic index table for each static index table, the dynamic index table being updated upon data being entered into the database table;
 d) intercepting a user's query to process a XML expression part of the query and converting the XML expression part into one or more rows in the static index table;
 e) generating a new query against the dynamic indexing tables, using values obtained from the static index table, and executing the generated query;
 f) rewriting the user's query by transforming XML path part of the user's query expression into a format understood by a database query engine; and
 g) returning a result to the user, after executing the rewritten query, together with any non-XML part of the user's query, that is executed by the database query engine.

2. The method of claim 1, wherein the one or more XML paths in b) is specified by the user in the form of respective XPATH expression and wherein the processed XML expression part of the query in d) is an XML XPATH expression part.

3. The method of claim 1, wherein the static index table contains one row per XML path.

4. The method of claim 2, wherein the static table is updated when the user defines a new database table with an XML column.

5. An electronic system that is programmable for indexing and querying XML documents stored in a relational database, using XPATH expressions, the electronic system comprising:
 a computer comprising a processor and a memory programmable to:
 a) allow a user to choose, within a database table, one or more columns for storing XML data of a known structure;
 b) obtain from the user one or more XML paths for indexed data, each of the obtained one or more XML paths being stored in a static index table;
 c) create, in response to the obtained one or more XML paths, at least one dynamic index table for each static index table, the dynamic index table being updated upon data being entered into the database table;
 d) intercept a user's query to process a XML XPATH expression part of the query and convert the XML XPATH expression part into one or more rows in the static index table;
 e) generate a new query against the dynamic indexing tables, using values obtained from the static index table, and executing the generated query;
 f) rewrite the user's query by transforming XML path part of the user's query expression into a format understood by a database query engine; and g) return a result to the user, after executing the rewritten query, together with any non-XML part of the user's query, that is executed by the database query engine.

6. A computer program product having a computer readable storage medium having an executable computer program recorded therein for indexing and querying XML documents stored in a relational database, using XPATH expressions, said computer program comprising code means to:
- a) allow a user to choose, within a database table, one or more columns for storing XML data of a known structure;
- b) obtain from the user one or more XML paths for indexed data, each of the obtained one or more XML paths being stored in a static index table;
- c) create, in response to the obtained one or more XML paths, at least one dynamic index table for each static index table, the dynamic index table being updated upon data being entered into the database table;
- d) intercept a user's query to process a XML XPATH expression part of the query and convert the XML XPATH expression part into one or more rows in the static index table;
- e) generate a new query against the dynamic indexing tables, using values obtained from the static index table, and executing the generated query;
- f) rewrite the user's query by transforming XML path part of the user's query expression into a format understood by a database query engine; and
- g) return a result to the user, after executing the rewritten query, together with any non-XML part of the user's query, that is executed by the database query engine.

* * * * *